US006811013B2

United States Patent
Dittmer et al.

(10) Patent No.: US 6,811,013 B2
(45) Date of Patent: Nov. 2, 2004

(54) CLUTCH RELEASE BEARING WITH IMPROVED SEALING ARRANGEMENT

(75) Inventors: Steffen Dittmer, Herzogenaurach (DE); Bernhard Klöpfer, Bad Windsheim (DE); Ludwig Winkelmann, Erlangen (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/449,688

(22) Filed: May 30, 2003

(65) Prior Publication Data

US 2004/0020743 A1 Feb. 5, 2004

Related U.S. Application Data

(63) Continuation of application No. PCT/EP01/13086, filed on Nov. 13, 2001.

(51) Int. Cl.[7] ............................................. F16D 23/14
(52) U.S. Cl. ....................... 192/98; 192/110 B; 384/482
(58) Field of Search .............................. 192/98, 110 B; 384/119, 477, 482, 617

(56) References Cited

U.S. PATENT DOCUMENTS

| 4,606,449 A | * | 8/1986 | Lederman | 192/91 A |
|---|---|---|---|---|
| 4,653,626 A | * | 3/1987 | Limbacher | 192/98 |
| 4,684,005 A | * | 8/1987 | Mittendorf | 192/98 |
| 4,838,402 A | * | 6/1989 | Feser | 192/98 |
| 4,874,073 A | * | 10/1989 | Tagawa | 192/98 |
| 5,287,951 A | | 2/1994 | Voit et al. | |
| 5,547,058 A | * | 8/1996 | Parzefall et al. | 192/85 CA |
| 5,620,076 A | | 4/1997 | Voit et al. | |
| 5,964,333 A | * | 10/1999 | Grosspietsch et al. | 192/85 CA |
| 6,126,324 A | * | 10/2000 | Ponson et al. | 384/612 |
| 6,464,060 B1 | * | 10/2002 | Ponson et al. | 192/98 |

FOREIGN PATENT DOCUMENTS

| DE | 43 38 261 A | 5/1994 |
|---|---|---|
| DE | 195 03 217 A1 | 8/1996 |
| FR | 2 709 526 | 3/1995 |
| GB | 1 254 821 A | 11/1971 |

* cited by examiner

Primary Examiner—Saúl J. Rodríguez
(74) Attorney, Agent, or Firm—Henry M. Feiereisen

(57) ABSTRACT

A clutch release bearing includes a housing, a first bearing ring having a skirt for fixed rotative securement of the bearing ring to the housing, a revolving second bearing ring connected to the separating clutch via a spring element, and a plurality of rolling elements guided between the first and second bearing rings. Seals are provided on both sides of the rolling elements at a distance thereto, wherein one seal is configured to seal an annular gap between the first and second bearing rings and includes a sealing arrangement which is securely fixed to the first bearing ring and comprised of at least two components to establish two sealing zones, wherein the second bearing ring and the sealing arrangement interact in such a way that a desired installation position of the sealing arrangement is automatically establishes as the second bearing ring is installed.

22 Claims, 4 Drawing Sheets

CLUTCH RELEASE BEARING WITH IMPROVED SEALING ARRANGEMENT

CROSS-REFERENCES TO RELATED APPLICATIONS

This application is a continuation of prior filed copending PCT International application no. PCT/EP01/13086, filed Nov. 13, 2001, on which priority is claimed under 35 U.S.C. §120, the disclosure of which is hereby incorporated by reference.

This application claims the priority of German Patent Applications, Serial Nos. 100 59 862.5, filed Nov. 30, 2000, and 101 52 484.6, filed Oct. 24, 2001, pursuant to 35 U.S.C. 119(a)-(d), the disclosure of which is incorporated herein by reference.

BACKGROUND OF THE INVENTION

The present invention relates, in general, to a clutch release bearing for use in a clutch operator, and more particular to a sealing arrangement for use in a clutch release bearing.

Various approaches are known to seal a clutch release bearing in order to prevent e.g. ingress of dirt and moisture into the interior of the clutch release bearing and escape of lubricant out of the clutch release bearing. German Pat. Publication DE 195 03 217 A1 describes a clutch release bearing for release of a separating clutch, including a torsionally rigid outer bearing ring, a revolving inner bearing ring, which is connected via a spring element to a separating clutch disposed between an internal combustion engine and a gearbox, and rolling elements, which are received in a cage and guided between the bearing rings. Seals are provided on both sides of the clutch release bearing at a distance to the rolling elements. A first sealing arrangement is securely fixed to the outer bearing ring and includes two spread-apart sealing lips which are supported by a cylindrical portion of the revolving inner bearing ring. A second sealing arrangement is secured to the housing and has a sealing lip resting against the revolving inner bearing ring. As the sealing lips of the sealing arrangements are all in sliding contact with the inner bearing ring, friction is increased, resulting in a heat-up of the clutch release bearing so that lubricant is subject to greater stress and the clutch release bearing is prone to fail prematurely. In other words, the service life is shortened. Seals for a clutch release bearing of this type are therefore unsuitable for many applications. In particular, there is a danger that the engagement disc of the, separating clutch causes swirling rubbed-off parts in the clutch housing, which accommodates the clutch release bearing, to migrate past the sealing lip into the clutch release bearing.

It would therefore be desirable and advantageous to provide an improved clutch release bearing which obviates prior art shortcomings and which realizes an enhanced sealing action, while still being simple in construction.

SUMMARY OF THE INVENTION

According to one aspect of the present invention, a clutch release bearing includes a housing, an outer first bearing ring having a skirt for fixed rotative securement of the first bearing ring to the housing, a revolving inner second bearing ring connected to the separating clutch via a spring element, a plurality of rolling elements guided between the first and second bearing rings, and sealing means provided on both sides of the rolling elements at a distance thereto, wherein the sealing means includes a sealing arrangement securely fixed to the first bearing ring and comprised of at least two components to establish two sealing zones for sealing an annular gap between the first and second bearing rings, wherein the second bearing ring and the sealing arrangement interact in such a way that a desired installation position of the sealing arrangement is automatically established as the second bearing ring is installed.

The present invention resolves prior art problems by providing a sealing arrangement which is made of at least two components to thereby realize two sealing zones. In this way, the annular gap between the inner and outer bearing rings of the clutch release bearing is effectively sealed. Moreover, the sealing arrangement according to the present invention is so constructed as to automatically occupy the desired sealing disposition, when the revolving bearing ring is installed.

A clutch release bearing according to the present invention incorporating a sealing arrangement in this manner ensures an effective sealing action, even when a motor vehicle is operated under extreme situations, for example an all-terrain vehicle during off-road use. Also, driving through water or exposure to dust will not adversely affect the effectiveness of the sealing arrangement to prevent ingress of foreign particles of any type into the clutch release bearing. Suitably, the sealing arrangement is so constructed as to avoid an inadmissible temperature increase in the sealing zones during the break-in phase or during normal operation. Through proper material selection, wear of the sealing arrangement and thus of the clutch release bearing and the clutch operator can be minimized to ensure an extended service life.

As the clutch release bearing is assembled, the sealing arrangement according to the present invention is able to automatically assume a desired disposition, when the revolving bearing ring is installed. The sealing arrangement occupies the optimum disposition during installation regardless of manufacturing tolerances of individual components of the clutch release bearing that directly interact with the sealing arrangement. In this way, the sealing arrangement is prevented from being loaded in axial direction so that wear is reduced and less heat develops, while at the same time the formation of an excessive sealing gap is precluded to maintain a sufficient sealing quality.

According to another feature of the present invention, the sealing arrangement may include a sealing disc which automatically assumes a defined disposition as the second bearing ring is installed. At the same time, a smallest possible sealing gap can be established, regardless of component tolerances or manufacturing tolerances. This can be realized through suitable configuration of the sealing arrangement and/or through material selection so as to ensure a sealing gap of intentionally slightly greater dimension after a break-in phase, without adversely affecting the sealing quality hereby.

According to another feature of the present invention, the sealing arrangement may include a seal carrier which is securely fixed to the first bearing ring and has a first carrier portion extending at a clearance to the revolving second bearing ring to define an annular gap therebetween for providing a first sealing zone. The seal carrier may include a sealing disc which, is placed at an end surface of the revolving second bearing ring for establishing) the second sealing zone. The two-stage sealing action is so constructed that the first sealing stage of the clutch release bearing protects against ingress of greater particles, while the following second sealing stage provides an effective sealing action against ingress of small or smallest particles such as dust and liquids and prevents an escape of lubricant.

The sealing disc provided for forming the second sealing zone is placed in an installation space which is defined between the end surface of the revolving bearing ring and a radial portion of the seal carrier. Through appropriate material selection of the sealing disc, it is possible to establish after the break-in phase a defined smallest possible sealing gap between the end surface of the revolving bearing ring and the sealing disc. The present invention also includes the provision a sealing disc which is supported on the side facing away from the end surface of the revolving bearing ring by a spring washer or spring element. Hereby, the seal carrier is so configured as to leave an axial clearance between the spring element and the radial portion of the seal carrier. The spring washer or spring element is intended to properly position the sealing disc on a cylindrical portion of the seal carrier, when the revolving bearing ring is installed, without impact on the installed disposition of the seal carrier, so as to establish an optimum position of the sealing disc upon the end surface of the revolving bearing ring.

According to another feature of the present invention, the seal carrier has a free end provided with a radially inwardly directed collar, which is partially or completely wrapped around, to realize a stiffening of the seal carrier. In this way, the stiffness is enhanced and a sealing action is ensured by the defined cylindrical portion of the seal carrier, even after installation of the revolving inner bearing ring.

According to another feature of the present invention, the cylindrical portion of the seal carrier is configured to span over the entire axial length of the revolving bearing ring to thereby extend the annular gap between the inner contour of the revolving bearing ring and the seal carrier. The thus prolonged annular gap between the seal carrier and the revolving bearing ring assumes the function of a labyrinth and thereby improves the sealing quality of the sealing arrangement.

According to another feature of the present invention, the sealing arrangement may include a sealing element which is received in the annular gap defined in radial direction by the seal carrier and the revolving bearing ring. Suitably, the sealing element is placed in the annular gap at a location distant to a securement zone of the seal carrier. The sealing element is suitably made of a material that deforms easily and does not affect the friction of the clutch release bearing to avoid a sliding contact and thus heating of the clutch release bearing also after the break-in phase.

When the seal carrier extends over the entire axial width of the revolving bearing ring, the free end of the seal carrier may be formed with a collar in the direction of the housing of the clutch release bearing. The provision of the collar prevents ingress of contaminants into an installation space which is defined radially by the housing of the clutch release bearing and the seal carrier and revolving bearing ring, respectively. In this way, the operation of the clutch release bearing is further enhanced.

According to another feature of the present invention, the free end of the revolving bearing ring may have a conical configuration so as to reduce the inner diameter of the revolving bearing ring. As a result, a wedge-shaped annular gap is established which is defined radially by the revolving bearing ring and the seal carrier. Contaminants or liquids migrating into the annular gap are conveyed back as soon as they reach the revolving bearing ring. The conical free end of the revolving bearing ring causes at the inner contour of the revolving bearing ring a decrease in circumferential speed. Dirt particles impinging on a revolving body shift always in the direction of greatest circumferential speed, so that the end portion of the revolving bearing ring, which acts as an inclined plane, causes a conveying effect and thereby prevents a further transport of contaminants or liquids into the sealing zone. Suitably, the inner contour of the revolving bearing ring may be provided with a conveying thread to further improve the sealing action of such a revolving bearing ring. The thread pattern is hereby suited to the rotation direction of the revolving bearing ring so that contaminants migrating to the conveying thread are forced to move in a direction away from the sealing zone.

According to another feature of the present invention, an intermediate space may be defined by the seal carrier and the revolving bearing ring in radial direction and the sealing element in axial direction, wherein the intermediate space is partially filled with lubricant. An example of lubricant includes grease with high adhesive property so as to reduce friction in the second sealing zone, i.e. between the sealing disc and revolving bearing ring which are in frictional contact. In addition, the introduction of adhesive grease in the intermediate space enhances the sealing effect of the sealing arrangement.

According to another feature of the present invention, the seal carrier may be provided with an annular groove which is open in the direction of the revolving bearing ring for receiving a sealing ring, e.g. a ring-shaped formed plastic part, or a felt ring, or a fleece ring. The sealing ring is urged against the revolving bearing ring at smallest possible contact pressure to define the first sealing zone of the sealing arrangement and assist in the effect of the sealing gap, respectively.

Suitably, the individual components of the sealing arrangement are made of different materials. The seal carrier may be produced on a large scale in the form of a deep-drawn part through a process without material removal. The sealing disc or sealing ring may be made in the form of a formed felt part or fleece part or as a component made of PA66GF. The use of a sealing disc of felt ensures the implementation of a smallest possible sealing gap between the sealing disc and the end surface of the revolving bearing ring after a break-in phase. This material ensures a good sealing action at minimal friction and is therefore preferably applicable as seal for a clutch release bearing.

According to another feature of the present invention, the seal carrier may be secured to the outer bearing ring in a force-fitting engagement, e.g. by providing the seal carrier on the outside with partially aligned retaining lugs of a diameter exceeding a diameter in a receiving zone of the outer bearing ring.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
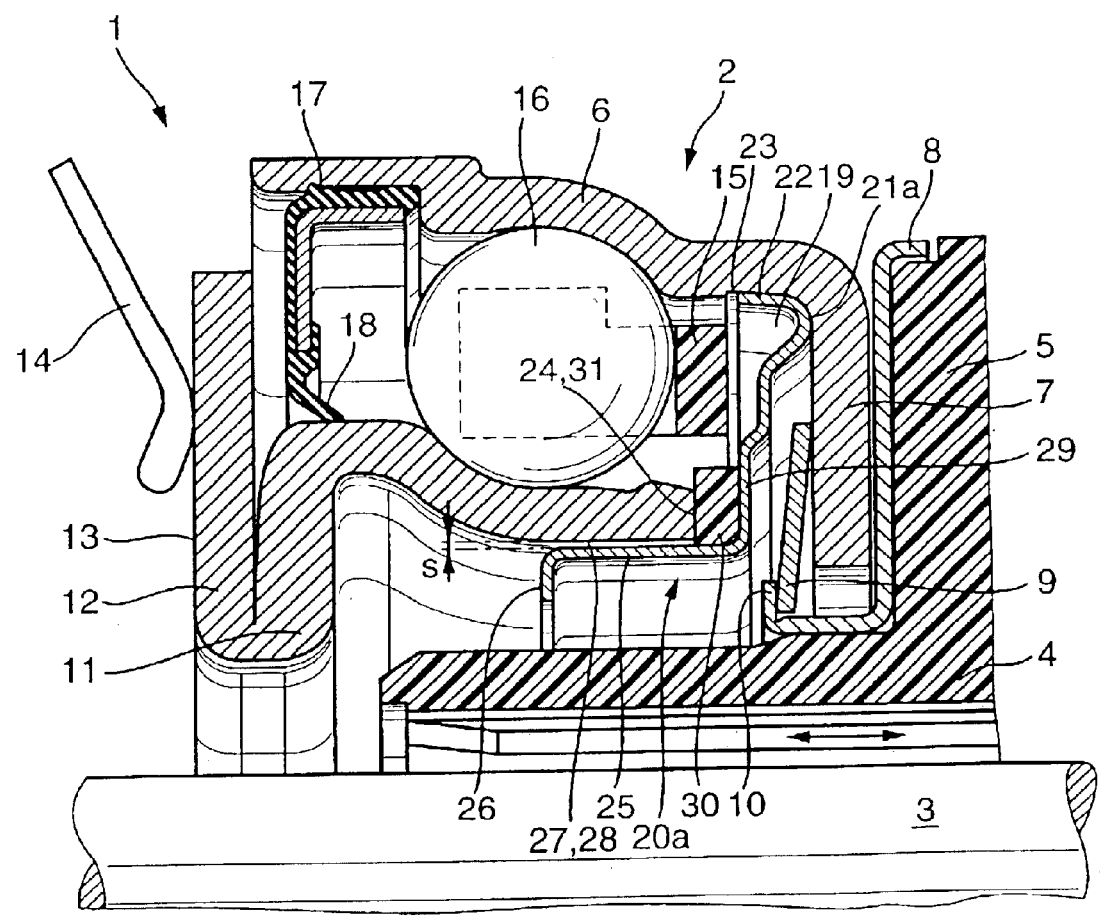
FIG. 1 is a half-section of a clutch operator having incorporated therein a first embodiment of a clutch release bearing according to the present invention.

Throughout all the Figures, same or corresponding elements are generally indicated by same reference numerals. These depicted embodiments are to be understood as illustrative of the invention and not as limiting in any way.

This is one of two applications both filed on the same day. Both applications deal with related inventions. They are commonly owned and have the same inventive entity and same title. Both applications are unique, and expressly incorporate the other by reference.

Turning now to the drawing, and in particular to FIG. 1, there is shown a half-section of an assembled clutch operator, generally designated by reference numeral 2 and disposed in a drive train between an internal combustion engine (not shown) and a gearbox (not shown) for operating a separating clutch (not shown). The clutch operator 2 includes a housing 4 which is movable in an axial direction, indicated by the double arrow, and is arranged in coaxial surrounding relationship to a drive shaft 3. The housing 4 is made of plastic and has a shoulder 5 which is directed radially outwards for support of a clutch release bearing according to the present invention, generally designated by reference numeral 1 and configured in the form of a tapered roller bearing.

The clutch release bearing 1 includes a torsionally rigid outer bearing ring 6 which has an inwardly directed annular skirt 7 fixedly supported against the shoulder 5 of the housing 4 through intervention of an interposed clip 8. The outer bearing ring 6 is hereby forced against the shoulder 5 of the housing 4 by a diaphragm spring 9 which is disposed between a collar 10 of the clip 8 and the skirt 7 of the bearing ring 6. The clutch release bearing 1 further includes a revolving inner bearing ring 11 which is provided with a radial ring flange 12 having an outer side 13 for forced engagement of a spring element 14, such as spring finger ends of the separating clutch.

Guided between the bearing rings 6, 11 are a plurality of rolling elements 16, which are received in a cage 15. The clutch release bearing 1 is further provided with seals on both sides of the rolling elements 16 at a distance thereto. A first sealing arrangement 17 is disposed on the side of the rolling elements 16 proximate to the ring flange 12 and spring element 14 of the separating clutch and fixedly secured to the outer bearing ring 6. The sealing arrangement 17 has a sealing lip 18 which is in contact with a cylindrical portion of the inner bearing ring 11. A second sealing arrangement, generally designated by reference numeral 20a, is disposed in opposition to the sealing arrangement 17 and intended to seal an annular gap 19, which is established between the bearing rings 6 and 11. The sealing arrangement 20a includes a seal carrier 21a which is configured as a deep-drawn part and made by a process without material removal and which is urged into forced engagement with the outer bearing ring 6 by snapping a leg 22 into a circular groove 23 of a respective securement zone. The seal carrier 21 extends from the securement zone thereof upon the outer bearing ring 6 in radial direction via a carrier portion 29 to an end surface 24 of the inner bearing ring 11 and continues with a cylindrical portion 25, which is disposed at a radial distance to the inner contour of the bearing ring 11, to terminate in a collar 26 which is turned inwardly in the direction of the housing 4.

As a result of the clearance between the cylindrical portion 25 of the seal carrier 21 and the inner contour of the bearing ring 11, there is defined an annular gap 27 to form a first sealing zone 28 of a width indicated by reference character "s". An installation space is axially demarcated between the end surface 24 of the bearing ring 11 and the radial carrier portion 29 for accommodation of a sealing disc 30 which is guided on the cylindrical portion 25 of the seal carrier 21a. A smallest possible sealing gap between the sealing disc 30 and the end surface 24 of the bearing ring 11 can be realized by making the sealing disc 30 of a material which is compressible and urged against the bearing ring 11 by a slight axial force. The sealing disc 30 defines hereby in concert with the end surface 24 of the bearing ring 11 a second sealing zone 31.

Figure 2:
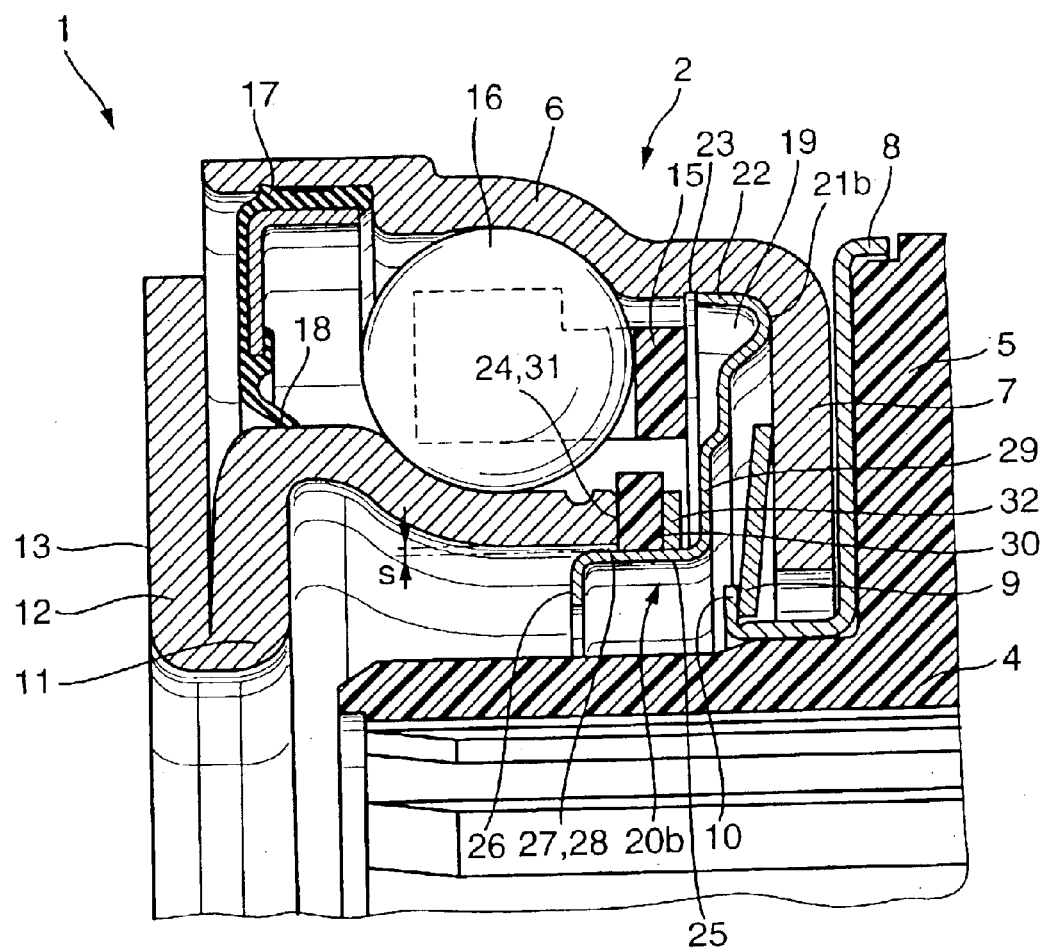
FIG. 2 is a half-section of a second embodiment of a clutch release bearing according to the present invention.
Figure 3:
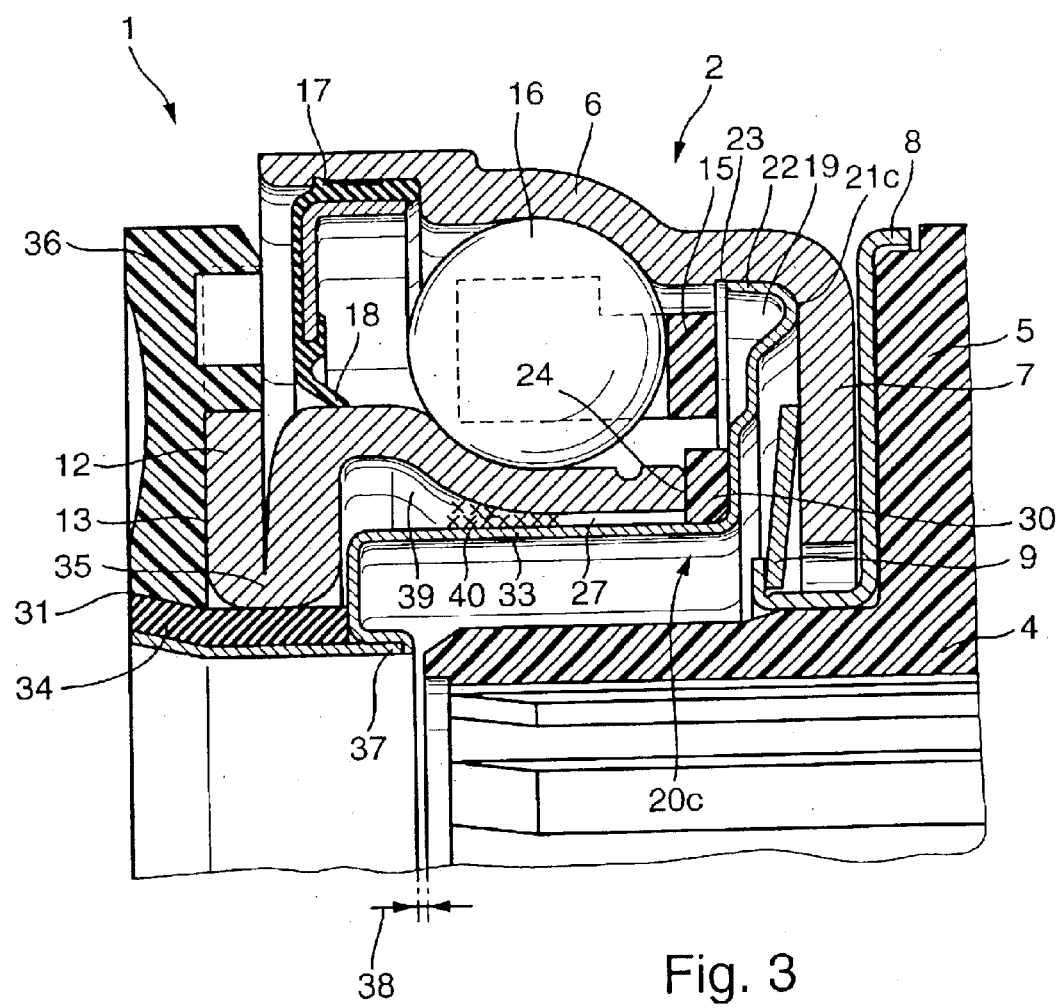
FIG. 3 is a half-section of a third embodiment of a clutch release bearing according to the present invention.

Turning now to FIGS. 2 and 3, there are shown further embodiments of a clutch release bearing according to the present invention, with the difference between the embodiments residing in the construction of the second sealing arrangement. Parts corresponding with those in FIG. 1 are denoted by identical reference numerals and not explained again. The description below will center primarily on the differences between the embodiments, relating primarily to the construction of the second sealing arrangement.

In FIG. 2, the clutch release bearing 1 includes a second sealing arrangement, generally designated by reference numeral 20b and having a spring element, e.g. a spring washer 32, for support of the sealing disc 30 on the side distal to the end surface 24 of the bearing ring 11. To create a greater installation space, the free end of the bearing ring 11 is shortened compared to the embodiment of the bearing ring in FIG. 1. As a consequence of the greater installation space, the sealing disc 30 is easy to install and is able to better self-adjust its disposition, whereby the sealing disc 30 is supported by a slight axial bias upon the end surface 24 of the bearing ring 11. Assembly is implemented by first positioning in place the seal carrier 21b and the spring washer 32 as well as the sealing disc 30 and the cage 15 with its rolling elements 16 as well as the sealing arrangement 17 before the revolving inner bearing ring 11 is installed. Hereby, as the bearing ring 11 is placed axially into the housing 4 of the clutch release bearing 1, the end surface 24 displaces the spring washer 32 and the sealing disc 30 along the cylindrical portion 25 of the seal carrier 21b. The spring washer 32 and the sealing disc 30 have hereby an inner diameter sized to enable a shift of these components at little axial force. Thus, the sealing disc 30 is supported at smallest possible axial bias upon the end surface 24 of the bearing ring 11.

In FIG. 3, the clutch release bearing 1 includes a second sealing arrangement, generally designated by reference numeral 20c and having a seal carrier 21c which has an axially stepped carrier portion 33 in the area of the inner contour of the inner bearing ring 11 and extends over the entire width and length of the bearing ring 11. The first sealing zone 27 is defined by providing the carrier portion 33 in an end zone with a sealing element 34 which spans a radial distance between the seal carrier 21c and the bearing ring 11 in the area of a shoulder 35. The sealing element 34 is configured to cover a large area across the entire axial width of the shoulder 35 and rests substantially without contact pressure radially upon the bearing ring 11. The carrier portion 33 as well as the sealing element 34 can extend in axial direction far enough to cover also a contact disc 36 which is securely mounted to the ring flange 12 of the inner bearing ring 11.

The seal carrier 21c of the sealing element 20c is further provided in the area of the sealing zone 31 with an axially oriented collar 37 of a length just shy of a confronting end surface of the housing 4 so as to leave an annular gap 38. In this way, ingress of dirt particles into an installation space, defined in radial direction by the carrier portion 33 and the housing 4, is prevented to thereby enhance the effectiveness and operation of the clutch release bearing 1 and thus the service life thereof. The carrier portion 33 and the bearing ring 11 further define in radial direction a ring-shaped compartment 39 for receiving lubricant.

Figure 4:
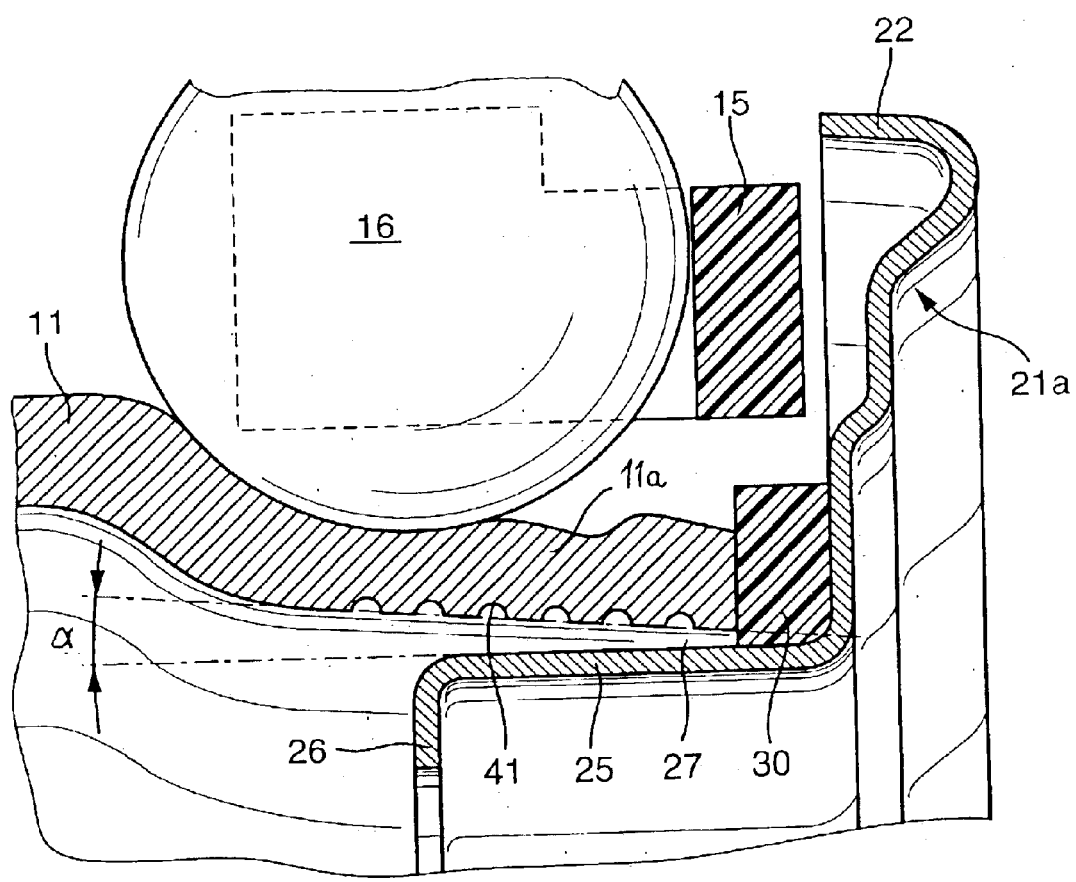
FIG. 4 is a detailed view, on an enlarged scale, of a modification of the clutch release bearing of FIG. 1.

Turning now to FIG. 4, there is shown a detailed view, on an enlarged scale, of a modification of the clutch release bearing 1 of FIG. 1, with the difference residing in the configuration of the inner revolving bearing ring 11. In accordance with FIG. 4, the bearing ring 11 has a conical end zone 11a of decreasing diameter toward the seal carrier 21a. The end zone 11a of the bearing ring 11 thus widens in the direction of the free end at an angle α so that the annular gap 27 exhibits a wedge-shaped configuration. Contaminants migrating into the annular gap 27 are conveyed back as the circumferential speed decreases at the inner contour of the bearing ring 11 in the direction of the free end of the bearing ring 11. To reinforce this effect, the inner contour of the bearing ring 11 is further provided with a conveying thread 41 which forces a return of contaminants that may have reached the inner contour of the bearing ring 11. Liquids or dirt particles are thus moved away from the sealing disc 30.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A clutch release bearing constructed as a tapered roller bearing for use in a clutch operator for release of a separating clutch disposed between an internal combustion engine and a gearbox, said clutch release bearing comprising:

a housing defining an axis;

a first bearing ring having a skirt for fixed rotative securement of the first bearing ring to the housing;

a revolving second bearing ring connected to the separating clutch via a spring element;

a plurality of rolling elements guided between the first and second bearing rings; and sealing means provided on both sides of the rolling elements at a distance thereto, said sealing means including a sealing arrangement securely fixed to the first bearing ring and comprised of at least two components to establish two sealing zones for sealing an annular gap between the first and second bearing rings, wherein the second bearing ring and the sealing arrangement interact in such a way that a desired installation position of the sealing arrangement is automatically established as the second bearing ring is installed.

2. The clutch release bearing of claim 1, wherein the sealing arrangement includes a sealing disc which automatically assumes a defined disposition as the second bearing ring is installed, and thereby establishes a sealing gap in one of the sealing zones of the sealing arrangement.

3. The clutch release bearing of claim 1, wherein the sealing arrangement includes a seal carrier securely fixed to the first bearing ring and having a first carrier portion extending at a clearance to the second bearing ring to define an annular gap therebetween for providing a first one of the sealing zones.

4. The clutch release bearing of claim 3, wherein the first carrier portion is cylindrical.

5. The clutch release bearing of claim 3, wherein the seal carrier includes a sealing disc which is placed at an end surface of the second bearing ring for establishing a second one of the sealing zones.

6. The clutch release bearing of claim 4, wherein the sealing disc is received in an installation space which is defined between the end surface of the second bearing ring and a radial carrier portion of the seal carrier.

7. The clutch release bearing of claim 4, wherein the sealing arrangement includes a spring element, said sealing disc and said spring element being guided together upon the first carrier portion of the seal carrier.

8. The clutch release bearing of claim 6, wherein the spring element is a spring washer.

9. The clutch release bearing of claim 3, wherein the seal carrier has a free end provided with a radially inwardly directed collar.

10. The clutch release bearing of claim 3, wherein the second bearing ring has an end portion tapered conically in relation to a symmetry axis of the housing to provide the annular gap of wedge-shaped configuration.

11. The clutch release bearing of claim 10, wherein the second bearing ring is provided with a conveying thread in the area of the end portion.

12. The clutch release bearing of claim 1, wherein the sealing arrangement includes a seal carrier securely fixed to the first bearing ring and having a first carrier portion extending at a clearance to the second bearing ring along an entire axial width of the second bearing ring.

13. The clutch release bearing of claim 12, wherein the seal carrier has a collar which defines a gap measure in conjunction with the housing.

14. The clutch release bearing of claim 3, wherein the annular gap is defined in radial direction by the seal carrier and the second bearing ring, said sealing arrangement further including a sealing element placed in the annular gap at a location distant to a securement zone of the seal carrier to the first bearing ring for defining the first sealing zone.

15. The clutch release bearing of claim 14, wherein the seal carrier and the second bearing ring define an intermediate space in radial direction and the sealing element defines the intermediate space in axial direction, said intermediate space being partially filled with lubricant.

16. The clutch release bearing of claim 3, wherein the seal carrier is a deep-drawn part made through a process without material removal.

17. The clutch release bearing of claim 3, wherein the seal carrier is snapped to the first bearing ring through one of force-fitting engagement and form-fitting engagement.

18. The clutch release bearing of claim 2, wherein the sealing disc is made of plastic.

19. The clutch release bearing of claim 2, wherein the sealing disc is made of PA66GF.

20. The clutch release bearing of claim 2, wherein the sealing disc is configured as a felt ring or a fleece ring.

21. The clutch release bearing of claim 3, wherein the seal carrier is provided with an annular groove which is open in the direction of the second bearing ring for receiving a sealing ring to define one of the sealing zones.

22. The clutch release bearing of claim 21, wherein the sealing ring is one of a felt ring and fleece ring.

* * * * *